(12) United States Patent
Jing et al.

(10) Patent No.: US 9,589,208 B2
(45) Date of Patent: Mar. 7, 2017

(54) RETRIEVAL OF SIMILAR IMAGES TO A QUERY IMAGE

(71) Applicant: Google Inc., Mountain View, CA (US)

(72) Inventors: Yushi Jing, San Francisco, CA (US); Yi Liu, San Bruno, CA (US); David Tsai, Atlanta, GA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 14/534,825

(22) Filed: Nov. 6, 2014

(65) Prior Publication Data

US 2015/0142708 A1    May 21, 2015

Related U.S. Application Data

(63) Continuation of application No. 13/163,317, filed on Jun. 17, 2011, now Pat. No. 8,909,563.

(51) Int. Cl.
*G06K 9/62* (2006.01)
*G06F 17/24* (2006.01)
*G06F 17/30* (2006.01)
*G06N 99/00* (2010.01)
*G06K 9/00* (2006.01)

(52) U.S. Cl.
CPC ......... *G06K 9/6256* (2013.01); *G06F 17/241* (2013.01); *G06F 17/30256* (2013.01); *G06K 9/00664* (2013.01); *G06K 9/622* (2013.01); *G06K 9/6215* (2013.01); *G06K 9/6218* (2013.01); *G06K 9/6267* (2013.01); *G06N 99/005* (2013.01)

(58) Field of Classification Search
None
See application file for complete search history.

(56) References Cited

PUBLICATIONS

El-Naqa et al., A Similarity Learning Approach to Content-Based Image Retrieval: Application to Digital Mammography, IEEE Transactions on Medical Imaging, vol. 23, No. 10 [online], Oct. 2004, [retrieved on Jun. 14, 2015]. Retrieved from the Internet:<URL:http://ieeexplore.ieee.org/stamp/stamp.jsp?tp=&arnumber=1339430>.*

Zheng et al, Visual Synset: Towards a Higher-level Visual Representation [online], 2008 [retrieved on Dec. 23, 2013]. Retrieved from the Internet:<URL:http://ieeexplore.ieee.org/xpls/abs_all.jsp?arnumber=4587611&tag+=1>.

Tsai et al., Large-Scale Image Annotation using Visual Synset [online], 2010 [retrieved on Feb. 24, 2013]. Retrieved from the Internet<URL:http://bluecoat-02/?cfru=aHROcDovL3NtYXJ0ZW NoLmdhdGVjaC51ZHUvYm10c3RyZWFtL2hhbmRsZS8x0DUz LzQONjQ1L21jY3YxMV92cy5wZGY/c2VxdWVuY2U9 MQ==>.

* cited by examiner

*Primary Examiner* — Stanley K Hill
*Assistant Examiner* — Nathan Brown, Jr.
(74) *Attorney, Agent, or Firm* — IP Spring

(57) ABSTRACT

Methods, systems, and articles of manufacture for annotating of an image are disclosed. These include scoring the image using a plurality of trained classifiers, wherein each of the trained classifiers corresponds to at least one of a plurality of image groups clustered based upon image similarity, and wherein each image group is associated with a set of weighted labels; selecting one or more of the image groups based upon the scoring; aggregating one or more sets of weighted labels associated with the selected one or more image groups; and annotating the image using the aggregated one or more sets of weighted labels.

20 Claims, 6 Drawing Sheets

RETRIEVAL OF SIMILAR IMAGES TO A QUERY IMAGE

CROSS-REFERENCE TO RELATED APPLICATIONS

This application is a continuation of U.S. application Ser. No. 13/163,317 filed Jun. 17, 2011, the disclosure of which is expressly incorporated herein by reference in its entirety.

BACKGROUND

Field

This disclosure relates generally to image annotation.

Background

As the availability of information grows, due at least in part to the advancements in computing technology and the growth of the Internet, searching for information has taken great importance. In order to take advantage of the massive amounts of network accessible data, such as text, image, and video data, each of these data types should be made searchable.

Searching for images presents many difficulties that are generally not encountered in searching text collections. Images, unlike text, do not necessarily have any uniform characters that are used across a broad spectrum of images. Images may include any number of characteristics, objects, and/or objects with any number of characteristics. The descriptions of the same image by different persons may be substantially different. Decisions must be made as to what feature(s) of an image are most important and should be described. The most apt description for each of the features, and for combinations of those features may also need to be decided. The annotating of images with one or more labels may facilitate searching for images. However, inaccurate tagging can lead to numerous situations of false positives and false negatives.

Image annotation methods include manual tagging where users assign one or more labels to describe the image. Labels may also be automatically generated based on metadata of images, such as, for example, location information, user information, and date and time of image capture information. However, manual tagging may not be scalable to the task of annotating the millions of images that are network accessible.

Other image annotation methods include latent Dirichlet allocation, probabilistic latent semantic analysis, and hierarchical Dirichlet processes, which require that the joint distribution over image features and annotations is learned. Requiring the determination of the joint distribution over image features and annotations can make these approaches difficult to scale to the large number of images available in web-scale environments. Methods based on discriminative models, nearest neighbor methods, and methods that rely on prior domain knowledge are also used for image annotation.

SUMMARY OF EMBODIMENTS

Methods, systems, and articles of manufacture for annotating of an image are disclosed. These include scoring the image using a plurality of trained classifiers, wherein each of the trained classifiers corresponds to at least one of a plurality of image groups clustered based upon image similarity, and wherein each image group is associated with a set of weighted labels; selecting one or more of the image groups based upon the scoring; aggregating one or more sets of weighted labels associated with the selected one or more image groups; and annotating the image using the aggregated one or more sets of weighted labels.

Further features and advantages, as well as the structure and operation of various embodiments, are described in detail below with reference to the accompanying drawings. It is noted that this disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

Embodiments disclosed herein are directed to the annotating of images. For example, a large corpus of images that is accessible through the web may be obtained and formed into a plurality of visual synsets. A "visual synset" is a cluster or group of visually similar images and associated labels. Labels may be weighted according to the relative relevance of the respective label to a particular image group. A new image (herein the phrase "new image" refers to any image that is to be annotated) may be annotated by selecting visual synsets that best match the new image, and then using the labels associated with the selected visual synsets to create the annotation.

Figure 1A:
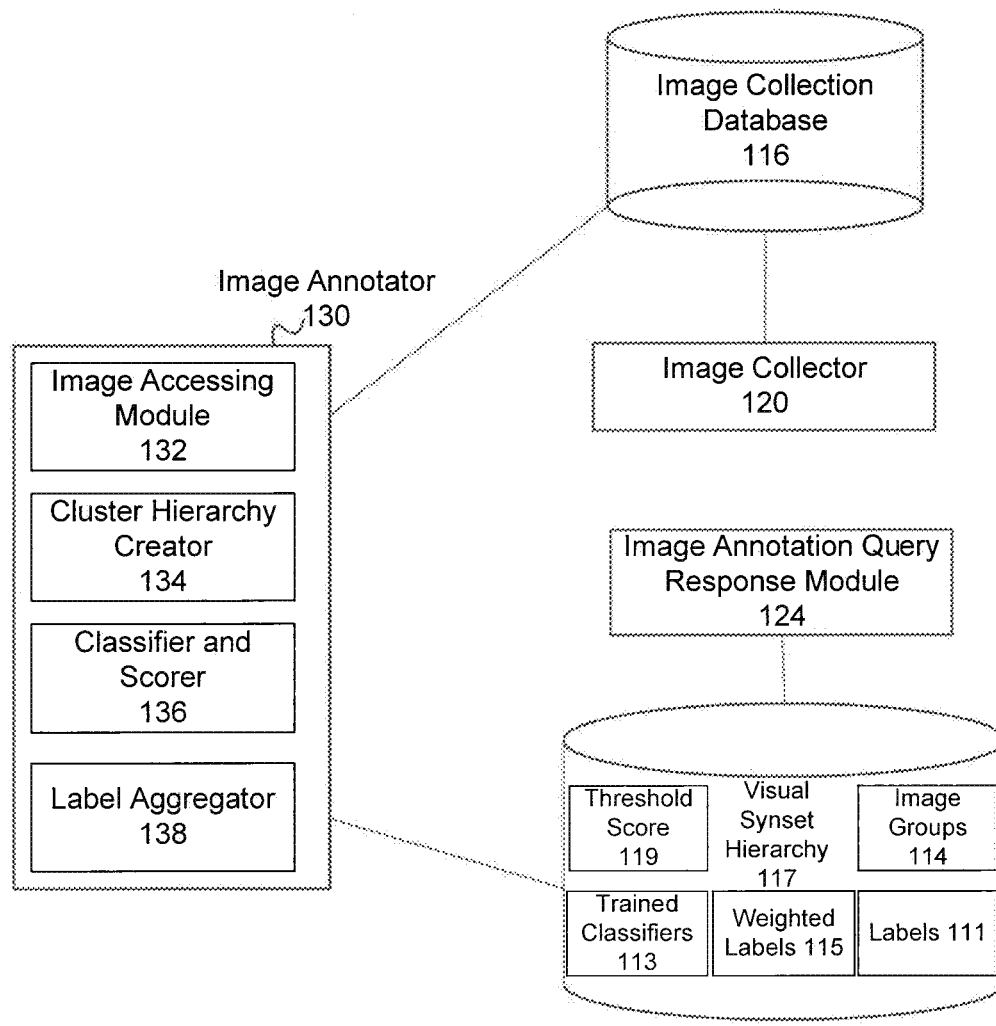
FIG. 1A illustrates a system for the annotating of images in accordance with an embodiment.

FIG. 1A illustrates a system 100 for annotating images in accordance with an embodiment. System 100 may be used to automatically annotate a large number of images, and use the image annotations to provide search results with those images in response to one or more search queries. The annotations, as provided by system 100, may include both visual similarities between images and semantic relationships amongst characteristics and/or descriptions of the images. System 100 may be used to efficiently and accurately annotate a large collection of images.

System 100 may receive a new arbitrary image, and based on a comparison of the new image against an existing database of images, system 100 may automatically assign relevant annotations to describe the image. The annotations used to describe the image may include multiple labels. The labels may be weighted based on relevance to a description of the image and/or arranged in order of a relative weighting. Each label (sometimes also referred to as "tag") may be of any length and may include any alphabetic, numeric, or other characters. System 100 can effectively assign annotations to images utilizing a large scale image repository.

System 100 includes an image collector 120 that collects images. Image collector 120 may, for example, collect images from the Internet, a database or other local or network-accessible system from one or more image corpora. The images collected by image collector 120 may be stored in an image collection database 116. The images may include digital images, renderings, photographs, graphics, screen shots, movie frames and/or any other type of visual image that may be rendered on a screen.

Image collection database 116 may include any structured or organized manner of storing image data. Database 116 may include still images, photographs, digital renderings, video, and/or other image data as used by the system 100, which may have been collected, retrieved or imported by image collector 120. Image collection database 116 may include annotations, descriptions, captions or other labels and/or categorizations associated with the images. The images stored in image collection database 116 may be organized based on the image categorizations and/or annotations as described below.

In other example embodiments, image collection database 116 may include pointers or other references to a source of an image. For example, image collection database 116 may include an indication of from which website an image was retrieved. Image collection database 116 may also include other information about the images, such as date created, file type and/or file size, image capture source information, image capture location information, user information, and other image metadata. According to an embodiment, image query information is associated with each image in image collection database 116. For example, the query information may be based upon image search queries issued by users, the resulting images returned, and user click information that indicates which of the returned images most interested the users.

The images (e.g., of image collection database 116) may be arranged into a plurality of image groups 114. Image groups 114 may include groupings or categorizations of images of system 100. The images of an image group 114 may be grouped based on visual similarity. According to an embodiment, images are first grouped according to a semantic concept, for example, based on queries to which respective images correspond. For example, using an image search service all images returned from searching the web for a query "engine" may be considered as corresponding to the semantic concept "engine." Then, for each semantic concept, the group of images is further divided into sub-groups based upon visual similarity. Each of the images may include, be associated with, or otherwise correspond to one or more labels 111 or weighted labels 115. According to an embodiment, respective image groups 114 may include image groups from a visual synset hierarchy 117.

Labels 111 may include labels, keywords or other forms of annotation that are associated with one or more of the images. Each label 111 may be associated with one or more of the groups in image groups 114. For example, if a label 111 is associated with an image in a particular image group 114, then that label 111 can be considered as being associated with that image group. A label may be considered associated with an image based on any of several criteria. Such associations may be based on already existing annotations of an image, objects recognized as present in the image using image processing, the appearance of the image and a label in the same web documents or web pages, and the like. Associations between images and labels can also be determined based upon image search queries and/or the resulting image sets generated. When considering queries and result sets, user click data such as the one or more images that were selected (e.g. clicked on) by a user in response to the query result may be used to refine any determined associations.

Labels, such as those in labels 111, may include textual descriptions of the images. Labels 111 may generally describe individual objects in the image and/or provide more specific semantic or holistic descriptions of the image. For example, a particular image may include several objects which may be provided with labels having general descriptions like "house" and "trees." The same image, however, may also be associated with a semantic or holistic description such as "Spanish-style cottage" and "Mediterranean house".

Weighted labels 115 may include labels from labels 111 with assigned or associated weights according to the relevance of the respective label to a particular image group. Weighted labels 115 may include a plurality of weighted labels for, or associated with, each image group 114. The weights may be assigned or determined based on the relationship or relevance of the labels or descriptions to the images in the particular image group 114. For example, those labels which are deemed more descriptive or closer (i.e. more relevant) matches to images in the image group may be weighted more heavily than those that may be deemed less descriptive or supplementary.

Weighted labels 115 may include terms that to describe an image, and that may be ranked or weighted based on relevance in describing an image. For example, labels describing an image of a house surrounded by trees may include both "house" and "trees", whereby "house" may be weighted greater than trees in describing the image as weighted labels 115. According to an embodiment, the relevance of a label with regard to a particular image group 114 may be determined based upon the relative frequency of occurrence of that label in relation to the respective images of that image group. For example, the relative frequency of occurrence of a label may be based upon a combination of, or based upon any one of, the number of images in the group in relation to which the label occurred, and the frequency with which the label occurred for the different images with respect to each of the images in the group.

Visual synset hierarchy 117 may include a plurality of respective hierarchically organized image groups 114. Each image group 114 in the visual synset hierarchy may include an associated set of labels from labels 111 and/or a set of weighted labels from weighted labels 115. Each of the hierarchically organized image groups in hierarchy 117 may, for example, group images according to different thresholds of similarity at each level of the hierarchy. For example, at the highest level of a hierarchy, the group may include only images that have the highest similarity. At the next level, for each image in the higher level group, a group of images may be formed with a lower threshold of similarity.

According to an embodiment, millions of weakly annotated Web images may be collected in, for example, image collection database 116, which are organized into image groups 114 and visual synset hierarchy 117. As it may be computationally expensive to cluster millions of images at once, a greedy approach may be adopted where images that are annotated with multiple queries are considered first. As described above in relation to image groups 114, the images in image collection database 116 may be initially partitioned by their associated text queries. Partitioning images based on image queries allows the images to be first separated according to a semantic concept as reflected by a query. Then, each of these partitions is clustered to determine visually similar image groups. By first partitioning according to semantic concept, and then proceeding to cluster according to visual similarity, embodiments may obtain separate hierarchies of image clusters for semantically diverse concepts even if they share visual similarities.

For each query, a separate similarity measurement may be determined for each type of feature, such as face signatures, textual, and global/local image features and the like. Visual similarity distances may be more reliable for shorter distances than those that are longer. In an embodiment, clustering can be started with a larger visual similarity distance, and the similarity distance may be reduced in each subsequent iteration. According to an embodiment, the similarity distance between two images is represented by a vector, where each element of the vector corresponds to a comparison of a feature between the two images. According to another embodiment, the similarity distance is a value representing the combined differences of one or more features between two images. The clusters from previous iterations can be merged into a smaller set of clusters.

Methods, such as affinity propagation may also be used to form visual synsets. A visual synset, as described above, includes a visually similar image group and associated set of labels. Affinity propagation simultaneously considers all the images as potential visual synsets and iteratively exchanges messages between images until a set of visual synsets emerges in which the visual similarity of images in each visual synset is above a threshold or until the visual synsets converge. The messages between images indicate whether or not each image should be a visual synset, and if not, to what visual synset that image should be assigned. At each iteration, clustering of the visual synsets is adjusted based upon the messages. According to some embodiments, instead of simultaneously considering all images as potential visual synsets, images may be considered based on a rank, for example, as determined by the number of queries associated with the image. Images in the same cluster may be used to form a visual synset. In each visual synset there may be a trade-off between the number of images and visual similarity. As the hierarchy goes deeper (e.g. number of levels of the hierarchy used is greater), the images in each image group may be more visually compact but each image group at the higher (more specific) levels may contain very few images. A threshold number of images may be required for image groups to be considered, and image groups with less than the threshold number of images may be removed from consideration.

The same image might appear in different visual synsets. For example an image of Droid X™ might appear both in "Droid X" and "cell phone" visual synsets. Each visual synset may be associated with multiple labels. As different labels are not equally important when describing respective visual synsets, a measure such as a term frequency-inverse document frequency (TF-IDF) may be determined for labels with regard to respective visual synsets and a label weights determined accordingly.

According to an embodiment, a set of visual synsets C and their associated images that maximizes (1) below may be determined:

$$F(C) = \Sigma_{i=1}^{N} S(x_i, L(x_i)) + \Sigma_{i=1}^{N} \delta_i(C) \quad (1)$$

Where $S(x_i, x_j)$ is the pair wise image similarity, and $\delta_i(C)$ is a penalty term that equals $-\infty$ if some image k has chosen i as its visual synset, without having been correctly labeled as a visual synset, or 0 otherwise. In (1), the set of image clusters may be denoted $X = \{x_1, x_2, \ldots x_N\}$ and the set of visual synsets as $C = \{c_1, c_2, \ldots c_K\}$ where $C \subset X$. Each image $x_i$ is associated with a visual synset $c_k$, or $L(x_i) = c_k$.

Each image group 114 or corresponding visual synset in hierarchy 117 may be associated with one or more trained classifiers 113. A trained classifier 113 may include logic that is or may be trained to determine whether a new image belongs or should be categorized within an image group 114 or corresponding visual synset. According to an embodiment, a trained classifier 113 is configured for each respective image group 114 or corresponding visual synset. Each trained classifier 113 may parse or otherwise step through a class or image group 114 and determine the visual characteristics common and/or uncommon to the group. Each trained classifier 113 may include logic that is trained specifically to compare selected features of a new image against a set of features predetermined for the image group to which the classifier is assigned. Based upon the comparison, the classifier may assign a score to the new image which reflects the relevance or the fit of the new image to that image group. Classifiers 113 can be trained using any of several learning methods. In web-scale image annotation, as in this case, there may be a large number of image groups 114, each of which requires a respectively trained classifier 113.

Efficient techniques are required to train classifiers 113 for large problem spaces such as web scale image annotation. According to an embodiment, each image may be represented by a feature or feature vector. One or many conventional sparse or dense float feature representations may be used. For example, features may be generated with a conventional bag-of-visual-words method. Various features including color, edge, etc. may be determined and they may be quantized by clustering on a large corpus of images, which has a sparse feature vector representation. The sparse representation may be converted to a dense representation, for example, by a conventional technique such as first computing L1 Hash and then computing the kernel principle component analysis (PCA) using Histogram Intersection Kernel. For each visual synset, the images of the visual synset may be considered as the positive training sample. A technique with which to obtain the negative training samples is to randomly sample images from all the other visual synsets. Another technique to determine the negative training samples is to leverage semantic information of web data to form a different sampling strategy. For example, relationships between labels can be determined by processing a large data corpus using a conventional natural language processing technique. These relationships may denote information like: "i is a k" or "k is i's parent". For example, i could be "apple" and k could be "fruit". Two labels may be siblings if they share a parent.

According to an embodiment, half of the randomly sampled images included in the negative training samples for a visual synset may be sampled from all other visual synsets, while the other half are sampled from images in the neighboring visual synsets. Due to the negative training samples being randomly sampled from among many visual synsets, the negative training samples may be sparsely distributed in the feature space whereas the positive training samples may be more compact.

Based on the training data, such as the positive training samples and the negative training samples, a one-vs-all linear support vector machine (SVM) model classifier for each visual synset may be trained. Many methods may be utilized in training the classifiers. According to an embodiment, a primal estimated sub-gradient optimization algorithm may be used to train the classifiers for respective image groups or visual synsets. In the primal estimated sub-gradient technique, the run-time does not depend directly on the size of the training set.

System 100 further includes an image annotator 130. Image annotator 130 may include one or more modules that may annotate images based on the existing store of images 116 and/or image groups 114. Particularly, image annotator 130 may annotate new images received in system 100 that are to be annotated. In some embodiments, the new image may be categorized and stored in image collection database 116 and/or incorporated into image groups 114.

Image annotator 130 may include an image accessing module 132 that may be configured to receive and/or process images. Image accessing module 132 may include logic to access images external to system 100, and/or images in image collection database 116. The image accessing module 132 may retrieve an image from the web or other source. Image accessing module 132 may be used in accessing images to form image groups 114 and also to receive new images to be annotated using system 100.

A cluster hierarchy creator 134 may be configured to insert or group respective ones of the accessed images into an image group 114 and/or visual synset hierarchy 117. Cluster hierarchy creator 134 can be configured to associate respective ones of labels 111 and/or respective ones of weighted labels 115 with each image group. According to an embodiment, cluster hierarchy creator 134 may cluster or group images in image collection 116 to form image groups 114 and/or visual synset hierarchy 117.

A classifier and scorer 136 may be configured to compare a new image (i.e., an image to be annotated) against the image groups to determine how and/or where to classify the image. Classifier and scorer 136 may use trained classifiers 113 to determine where to classify the image. System 100 may include a plurality of trained classifiers 113 that operate in parallel to determine where to classify an image. For example, the new image to be annotated may be processed by classifiers 113 corresponding to respective image group 114 in parallel. Upon comparing an incoming image against the images of image groups 114, each classifier may return a score. The trained classifiers 113 may determine the scores based on visual similarities between the new image and the images of image groups 114 and/or of hierarchy 117.

Classifier and scorer 136 may then compare the scores returned by the respective trained classifiers 113 against one or more threshold scores 119. Threshold score 119 indicates an acceptable score that must be met for an image to be considered to be part of an image group 114. Threshold score 119 may be set at the same value for each image group 114, or may be set at different values for each of the image groups 114. Threshold score 119 may be heuristically determined. Image groups 114 associated with trained classifiers 113 that return a score less than threshold score 119 may be disregarded as being inaccurate or irrelevant with regards to classifying and/or annotating the new image. Once classifier and scorer 136 makes a determination as to which of image groups 114 meet or exceed the threshold, those image groups 114 may be considered as having the most appropriate images and annotations for the new image. According to an embodiment, all image groups 114 that meet or exceed the threshold are considered as equally eligible matches for the new image. In this embodiment, the scores (as returned by the trained classifiers 113) of those eligible image groups 114 may be ignored, and an annotation for the new image may be determined by concatenating the labels of all eligible image groups. The selection of the labels for the annotation may be based upon the weights assigned to the respective labels. For example, only a predetermined number of labels from each eligible group may be used in forming the annotation for the new image. In other embodiments, one or more of the eligible image groups 114 may be selected and their labels concatenated into forming the annotation for the new image.

According to an embodiment, classifier and scorer 136 may only reference or use those image groups 114 that include more than a threshold number of images. For example, if an image group 114 only includes a single image, then image group 114 may be considered too small from which to find a reliable score. Then for example, a score returned from trained classifier 113 associated with an image group 114 that is too small may be disregarded.

A label aggregator 138 may analyze labels 111 or weighted labels 115 for the images in image groups 114 corresponding to trained classifiers 113 that returned scores greater than or equal to threshold 119. For each of image groups 114 with scores exceeding threshold 119 for a new image, label aggregator 138 may compare and aggregate those labels that occur most often and/or that have the greatest weight amongst the images of the image groups 114. According to an embodiment, label aggregator 138 may aggregate all the labels and/or their associated weights to determine which labels 111 or weighted labels 115 should be associated with or annotated to an incoming image. In an embodiment, the label aggregator 138 may perform additional functions and/or filtering to determine how to annotate an incoming image. For example, label aggregator 138 may determine how many times a label appears in the selection of image groups 114 exceeding threshold 119, and those labels that appear fewer than a certain number of times may be discarded and/or only the top five, ten or other number of labels may be used.

According to an embodiment, a ranking of labels may be incorporated in visual synset hierarchies with weighted labels. The ranking may be generated with a computationally-efficient voting scheme. A vector K may be used to denote the label for an image group or corresponding visual synset, and the length of K is the number of all possible labels. If label j exists in visual synset i, the $j^{th}$ dimension of K would be the corresponding visual synset or otherwise 0 if the label is not in the visual synset.

For example, for a new image, first its features x is calculated and then passed to all the visual synsets selected for scoring. If the response is above a threshold, the visual synset is accepted for annotation. Then label voting may be performed by aggregating the label information associated with all the accepted visual synsets. The label vector L may be defined as:

$$\Sigma_{i=1}^{n} I(w_i \cdot x + b_i > T) \Sigma_{j=1}^{m} K_{i,j}$$

in which w and b are parameters learned by a linear SVM, and T is a threshold selected over a separate validation set to decide the acceptance of visual synsets. $I(\cdot)$ is the indicator function that only accepts the responses that are above the threshold T.

The described voting scheme can be compared to an extension of the conventional nearest neighbor methods. However, in the described voting scheme the nearest visual synsets or image groups for a new image are selected and their labels are propagated into (i.e., associated with) the image. By pre-training images into image groups and visual synset hierarchies, the neighbors of each visual synset or image group are reduced into a smaller space, which makes it more scalable than the traditional nearest neighbor method.

According to an embodiment, the respective scores returned by the classifiers are discarded for image groups or hierarchies above a threshold, and a binary decision whether the new image is eligible to be included in the image group or hierarchy is made. According to another embodiment, the classifier output score of all classifiers may be determined and a prediction of label ranking can be made purely based on the score. However, regarding all the accepted visual synsets as equal may significantly improve the annotation by presenting a more holistic annotation. Another benefit of this technique may be that it boosts the ranking of a specific annotation (e.g. apple) rather than general description (e.g., food). By computing the TF-IDF directly from the training data, negative effects that could potentially be caused by predetermined word hierarchies can be avoided.

An image annotation query response module 124 may use the stored images as grouped (e.g., in image groups 114 and hierarchy 117) to return annotated images, images related to one or more query terms, or one or more query terms related to an image. For example, image annotation response module 124 may receive a new image, which does not have any annotations associated with it, from a client. Image annotation response module 124 may then use image annotator 130 to annotate the received new image. Image annotation query response module 124 may then return the annotated images. According to another embodiment, image annotation query response may receive other types of queries from clients. For example, images from hierarchy 117 or image groups 114 that match the received new image may be returned.

System 100 may allow for a large-scale buildup of a repository of image groups 114. The image annotations may allow for greater organization and relationships among like images. System 100 is scalable to allow for the indexing and annotation of new images based on a repository that may include millions or billions of images. Having such a wide selection of images from which to base the annotation of new images allows system 100 to annotate newer images more accurately than would be possible on smaller or less-scalable systems. Moreover, a large-scale repository of grouped images and associated labels may enable the assignment of annotations to images, where the annotations provide a more holistic description of the image.

In addition to allowing for the classification of the images based on visual similarities, weighted labels 115 allow system 100 to provide a more holistic description of the images of image groups 114 as stored in system 100. Weighted labels 115 allow for more accurate image annotations and/or image retrieval when responding to a search query, and may include labels that exceed simple visual characteristics of an image. For example, weighted labels 115 may include text retrieved from a web page associated with the image and may be applied to weighted labels 115.

Figure 1B:
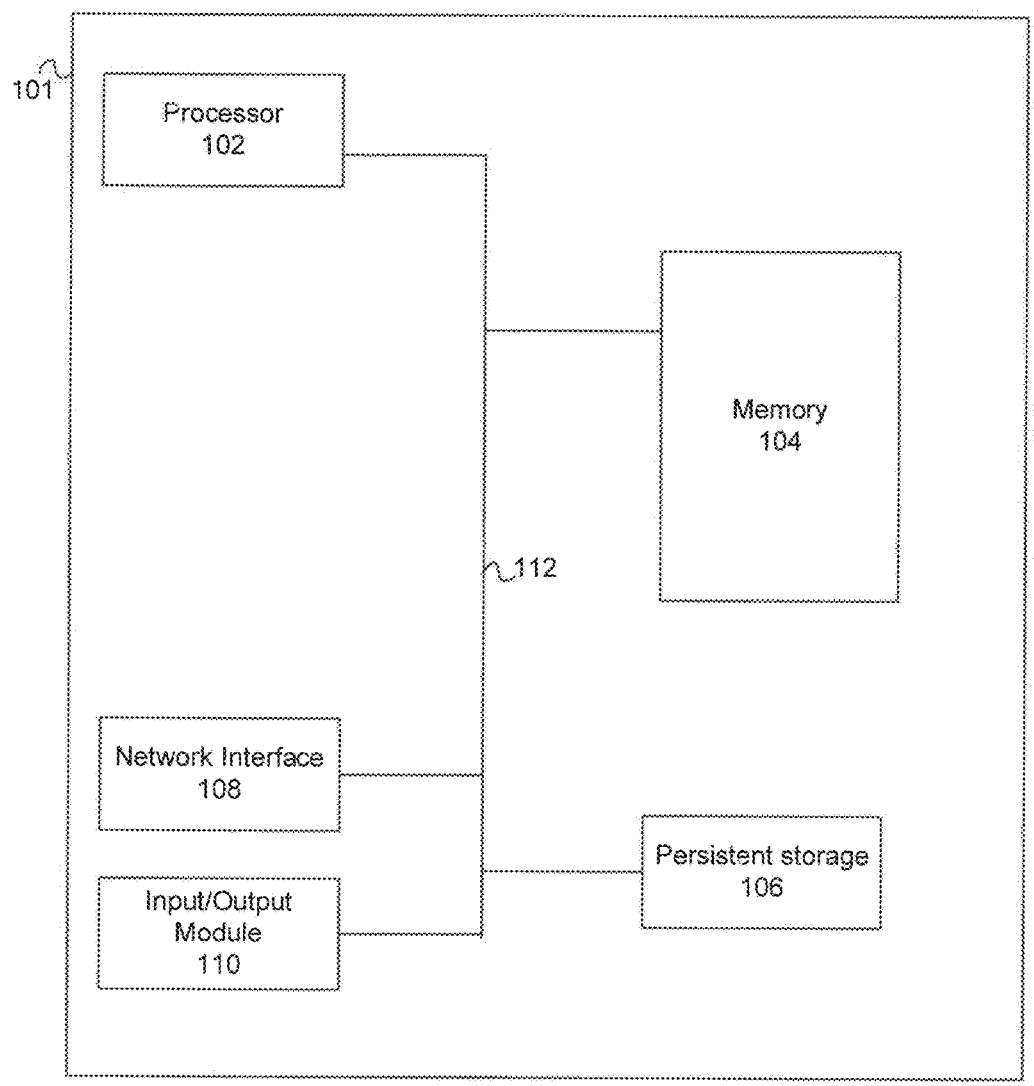
FIG. 1B illustrates a computer in which the system for annotating images can be implemented in accordance with an embodiment.

FIG. 1B illustrates a computer 101 that can implement the system 100 for annotating images in accordance with an embodiment. Computer 101 includes a processor 102 which may include any computer or electronic processor for executing and/or processing information, including visual and/or textual information. Processor 102 may include or be part of any device capable of processing any sequence of instructions. Processor 102 may include, for example, a computer processor, a processor in a mobile device or other electronic and/or digital processor. Processor 102 may, for example, be included in a computer, a mobile computing device, a set-top box, an entertainment platform, a server, a server farm, a cloud computing system and the like.

Processor 102 may be connected to a memory 104 via a bus 112. The memory 104 may include volatile memory, persistent, virtual or otherwise, to store information for use by or output by system 100. Memory 104 may include, for example, random access memory (RAM) and/or dynamic RAM (DRAM). Memory 104 may be used to store any information, such as state information of system 100. Memory 104 may also, for example, be used to store instructions of system 100.

Bus 112 may include a communication infrastructure that allows interaction between the various components of system 100. Bus 112 may, for example, carry data between the components of system 100, such as between processor 102 and memory 104. Bus 112 may include a wireless and/or wired communications medium between the components of system 100, and may include parallel, serial or other topological arrangements.

A persistent storage 106 may include components such as memory or other persistent storage as used by system 100 to store data over some extended period of time (e.g., as compared to the memory 104). Persistent storage 106 may include non-volatile main memory as used by processor 102 in system 100. Persistent storage 106 may include, for example, flash memory, a hard disk or optical disk.

A network interface 108 may include any device that connects system 100 to one or more networks. For example, network interface 108 may allow system 100 to connect to one or more computers or systems, such as an intranet or the Internet.

An input/output module 110 may include any module or interface through which the system 100 may receive input and/or provide output. Input/output module 110 may, for example, receive a search query from a user for one or more images, or may receive an image that needs to be annotated or otherwise classified. In an example embodiment, input/output module 110 may be used by system 100 to provide one or more images resulting from a query search. Input/output module 110 may also receive images and annotations that are input to image collection database 116 and/or image groups 114.

Figure 2:
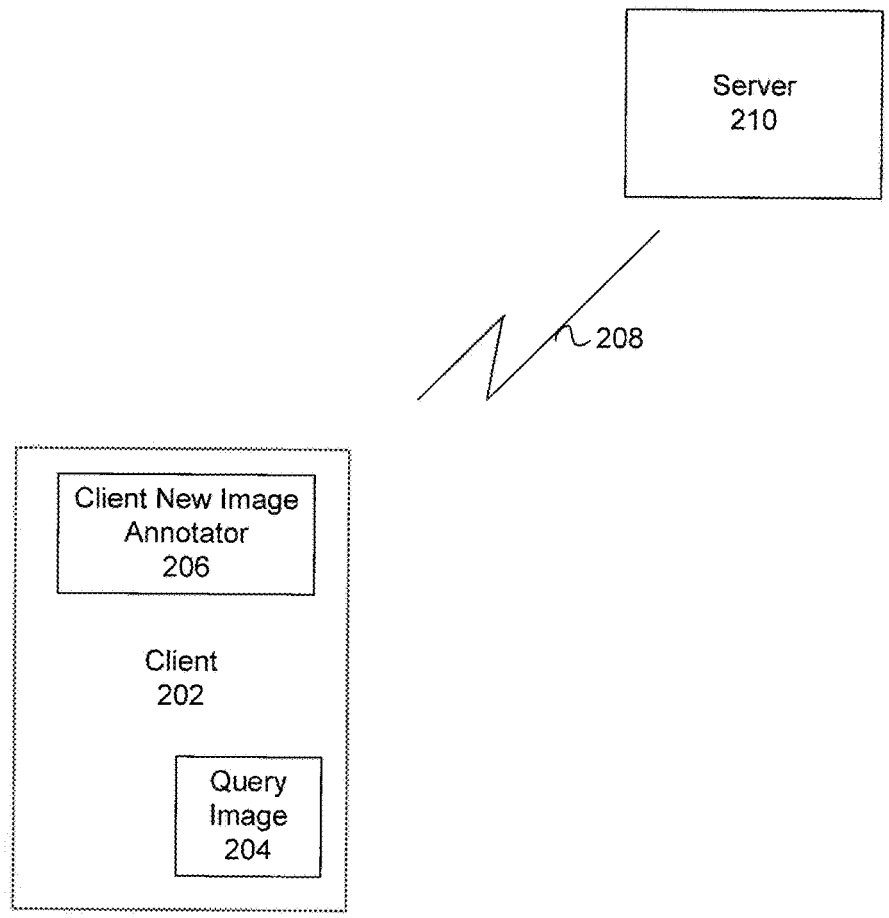
FIG. 2 is an example embodiment of a system for annotating images as implemented in a client-server environment in accordance with an embodiment.

FIG. 2 is an example embodiment of a system 200 for annotating images as implemented in a client-server environment. System 200 may include a client 202 and a server 210 that communicate over a network 208. Client 202 may include any computing system, including a laptop, desktop, tablet PC, mobile phone or other network-enabled processing device. In an example embodiment, client 202 and server 210 may be running or operating on the same device.

Server 210 may include any device or system that performs functions discussed above with regards to system 100. Server 210 may include any computing device or networked connection of computing devices including, but not limited to, a web server, a server farm, or cloud computing environment.

Network 208 may include any wired or wireless connection allowing for communication between client 202 and server 210. Network 208, according to an example embodiment, may be provided by a network service provider.

According to an embodiment, a user of client 202 may find a query image 204. Query image 204 may include any image to be annotated by system 100. Query image 204 may include, for example, an image taken from a camera, such as a cell phone camera, and/or found on a website.

A client new image annotator 206 may receive the query image 204 and provide query image 204 to server 210 for processing. In an example embodiment, client new image annotator 206 may perform some functions associated with system 100, such as retrieving information about the query image 204 source. For example, client new image annotator 206 may capture information about when and/or where the image was captured and provide that information with query image 204 to server 210. Server 210 may then annotate the image as described above with reference to system 100 and return a message that the image was successfully annotated and/or return another message such as weighted labels 115 with which the image was annotated. In another example embodiment, client new image annotator 206 may return images similar to the query image 204, whereby the query image 204 may be provided to find other similar images.

Figure 3:
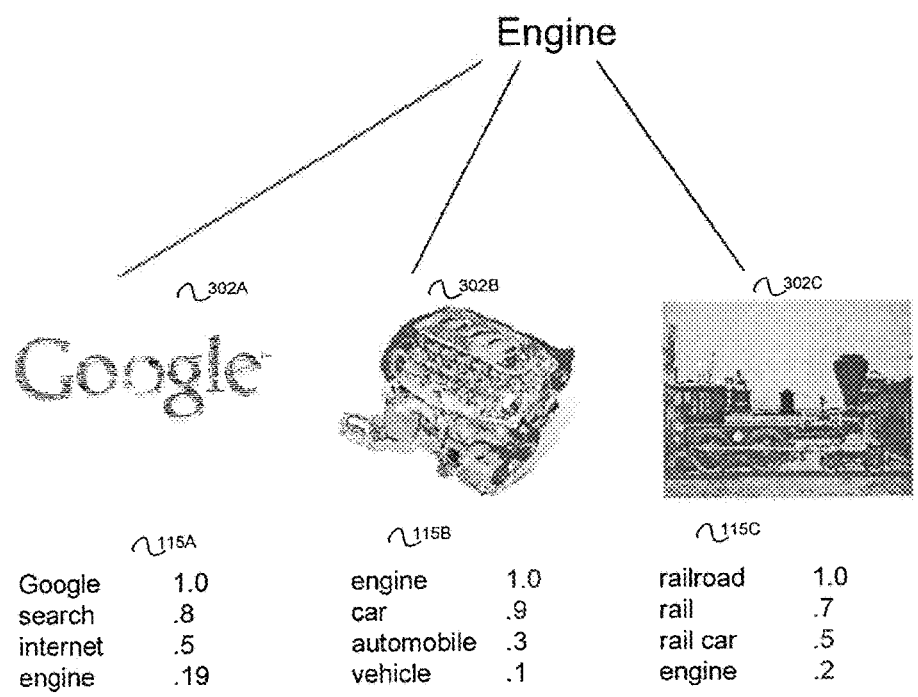
FIG. 3 illustrates an example of visual synsets including image groups and associated weighted labels in accordance with an embodiment.

FIG. 3 illustrates an example 300 of related groups of images. Groups of images obtained for a query term "engine" may include one or more image groups 302A, 302B, and 302C. Image group 302A may include images that most closely represent the Google logo. Similarly, image groups 302B and 302C may most closely represent, respectively, a motor engine or railroad engine. In hierarchy 117, the top level group of images may include, for example, groups of images 302A-C. At the next level lower of the hierarchy, each image of respective image groups 302A-C may belong to a separate group. For example, group 302A, for which a representative Google logo is shown, may include only images of the logo. At the next level each image in the first level group may have its own group, with a more relaxed (than the higher levels) measure of similarity.

Image groups 114 at the highest level, or each group in hierarchy 117, may contain a label "engine" in common. For example, weighted label sets 115A, 115B, and 115C associated respectively with image groups 302A, 302B, and 302C may include the label "engine." However, each image group may have a different weight associated with the label "engine." For example, with the label "engine", the first image group 302A may be that of the Google logo, whereby the label "engine" may have a weight of 0.19 in 115A. Other labels in 115A may include Google, search, and internet, with respective weights 1.0, 0.9, and 0.5. The second image group 302B may be that of a motor engine, whereby the term "engine" may have the greatest weight 1.0 in 115B than the corresponding weight for "engine" in 115A and in 115C. Other labels in 115B may include car, automobile, and vehicle, with respective weights 0.9, 0.3, and 0.1. 302C illustrates an image group with "railroad engine" which may be associated with a weight 0.2 for "engine" in 115C that is greater than for a search engine (in 115A) but less than for a motor engine (in 115B).

Figure 4:
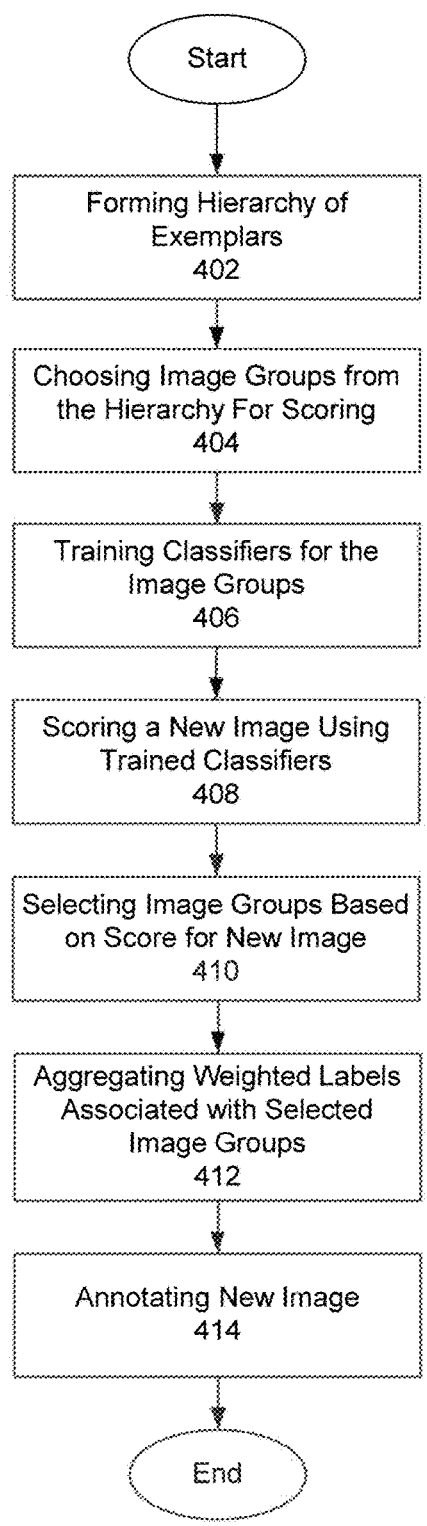
FIG. 4 is a flow diagram illustrating a method for annotating an image in accordance with an embodiment.

FIG. 4 is an example process 400 for annotating an image, according to an embodiment. At step 402, after a start step, a hierarchy of visual synsets is formed. In reference to FIG. 1, visual synset hierarchy 117 may be formed. As describe above, a visual synset is a group of visually similar images with associated labels. Cluster hierarchy creator 134 may analyze the images from image collection database 116 and/or image groups 114 to form visual synset hierarchy 117. There may be any number of ways by which to organize or form visual synset hierarchy 117. For example, images in image collection database 116 can be clustered according to visual similarity to generate image groups 114, and further to create a visual synset hierarchy 117, as described above.

At step 404, visual synsets are selected for scoring. For example a subset of one or more image groups 114, together with the associated weighted labels 115, from the visual synset hierarchy 117 may be selected for scoring. Scoring may include, for example, evaluating how a new image that is input to the system matches against each of a number of visual synsets. According to an embodiment, visual synsets that do not have more than a predetermined number of images and/or associated labels may not be considered. According to another embodiment, visual synsets above a predetermined level of the hierarchy (e.g. first two levels) may be chosen for scoring. In one embodiment, all visual synsets at the highest level (e.g., grouped based on the strongest visual similarity) may be selected for scoring.

At step 406, classifiers are trained for visual synsets. For example, a separate classifier may be trained for each of the selected visual synsets 117 and/or a single classifier may be used for and/or trained with visual synsets from hierarchy 117. The training of image classifiers 113 may include sorting, ranking, and/or identifying the features of images in each image group 114, such that when a new image is presented to a classifier 113, classifier 113 may efficiently determine whether or not the new image is a member of a particular image group 114 and/or a particular visual synset 117. The training of the image classifiers 113 may include using both positive training and negative training, whereby the positive training may include using images that belong to an image group 114 and the negative training may include using images that do not belong to an image group 114. The positive and negative training may allow a classifier 113 to more accurately determine features of images that belong to a group and features of images that belong to different groups (that may be closely related to a particular image group, as used for the positive training).

At step 408, a new image is scored using trained classifiers. Trained classifiers 113 may each score a new image against the images of selected visual synsets 117 to which trained classifiers 113 correspond. System 100 may include any number of trained classifiers 113 which may operate in parallel, such that within a very short time frame, system 100 will know the scores of the new image against image groups 114.

At step 410, one or more image groups and/or visual synsets are selected based on a score for the new image. For example, classifier and scorer 138 may select one or more visual synsets 117 based on which scores for the new image, as were returned, exceeded threshold score 119.

At step 412, weighted labels associated with selected image groups and/or visual synsets are aggregated. For example, label aggregator 138 may aggregate the labels of weighted labels 115 that are associated with the selected image group 114 or visual synset 117. For example, label aggregator 138 may combine weighted labels 115 corresponding to image groups 114 that exceed threshold 119. The combination can be a concatenation of the labels in an order determined by the weights of the respective labels At step 414 the new image is annotated. For example, based on the aggregated labels for the new image, an annotation for the new image may be assigned. Various processing based on the aggregated labels may be used to determine the annotation. According to an embodiment, the annotation corresponds to the aggregated labels ordered in order of their respective weights. Other embodiments may include, but are not limited to, combining duplicate labels according to a predetermined method, constructing annotation strings based on aggregated labels, and the like. The process may end after step 414.

Figure 5:
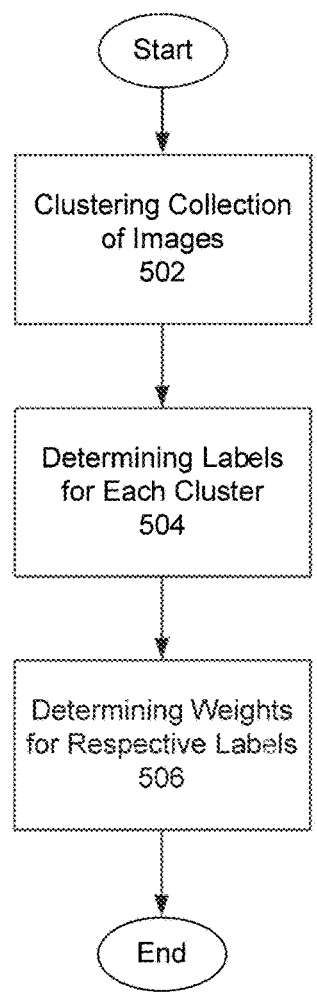
FIG. 5 is an example method for generating a hierarchy of image clusters and associated sets of labels in accordance with an embodiment.

FIG. 5 is an example method 500 for creating a visual synset hierarchy, according to an embodiment. For example, method 500 may be performed in generating hierarchy of visual synsets 117. At step 502, after a start step, a collection of annotated images is clustered. For example, as described above, cluster hierarchy creator 134 may cluster or group images from image collection database 116. Grouped images may be organized as a plurality of hierarchies based on similarities of the images. Cluster hierarchy creator 134 may, for example, determine visual similarities between the images to determine which images should be clustered or grouped together.

At step 504, labels are determined for each cluster. For example, cluster hierarchy creator 134 may determine labels for each image group in an image group hierarchy created in step 502. Cluster hierarchy creator 134 may determine labels based upon existing annotations, weak annotations, the respective image appearing in the context of one or more labels, image search query results, comparing the images to other images available in image groups 114, and/or by searching the Internet or other source.

At step 506, weights for respective labels are determined. The weight assigned to a label may be specific to an image group and/or to a visual synset. The weight of a label assigned to an image group and/or visual synset reflects the relevance of that label to that image group or visual synset. For example, based on a frequency of occurrence within a label set, larger weights may be assigned to those labels that appear more often with respect to images in the image group. As a result of performing steps 502-506, a hierarchy of visual synsets, such as hierarchy 117, may be formed. The process may end after step 506.

According to another embodiment, the clustering of images may be performed based upon visual similarity as well as the textual similarity of labels associated with the respective images being clustered. For example, in such an embodiment, steps 502 and 504 may be combined.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A computer implemented method comprising:
   receiving a query image;
   scoring the query image using a plurality of trained classifiers, wherein each of the trained classifiers corresponds to at least one of a plurality of image groups of images clustered based upon image similarity, and wherein each of the image groups is associated with a set of weighted labels and wherein at least two of the image groups have a common label with a different weight, and wherein the cluster of the plurality of image groups is further based upon queries associated with respective images in the plurality of image groups;
   selecting one or more of the image groups based upon the scoring;
   annotating the query image using the weighted labels of the selected one or more image groups; and
   returning one or more of the images in the selected one or more image groups.

2. A computer implemented method comprising:
   receiving a query image;
   scoring the query image using a plurality of trained classifiers, wherein each of the trained classifiers corresponds to at least one of a plurality of image groups of images clustered based upon image similarity, and wherein each of the image groups is associated with a set of weighted labels and wherein at least two of the image groups have a common label with a different weight;
   selecting one or more of the image groups based upon the scoring and further based upon each of the image groups having at least a threshold number of images; and
   returning the images in the selected one or more image groups.

3. The method of claim 2, wherein scoring the image comprises assigning a score based upon a distance of a set of features of the query image to a set of features representative of a respective one of the image groups.

4. The method of claim 2, wherein scoring the image comprises filtering ones of the plurality of image groups that have a score of less than a threshold.

5. The method of claim 2, wherein each of the plurality of classifiers is trained using a linear model.

6. The method of claim 2, wherein a classifier from the plurality of classifiers is trained for a selected one of the image groups using a positive training sample and a negative training sample, wherein the positive training sample comprises images from the selected group, and wherein the negative training sample comprises images from neighboring groups of the selected group.

7. The method of claim 6, wherein the negative training sample further comprises images from at least one of other image groups.

8. The method of claim 2, wherein the cluster of the plurality of image groups is further based upon queries associated with the respective images.

9. The method of claim 2, wherein the weighted labels are based, at least in part, upon the frequency of occurrence of the label in the image group.

10. The method of claim 2, further comprising:
    training one or more classifiers for each of the respective groups to create the plurality of trained classifiers, wherein at least one of the classifiers is trained for each of the respective image groups.

11. A computing system including a processor and a memory configured to perform operations comprising:
    scoring a query image using a plurality of trained classifiers, wherein each of the trained classifiers corresponds to at least one of a plurality of image groups of images clustered based upon image similarity, and wherein each of the image groups is associated with a set of weighted labels and wherein at least two of the image groups have a common label with a different weight;

selecting one or more of the image groups based upon the scoring and further based upon the image groups having a threshold number of images; and returning the images in the selected one or more image groups.

12. The computing system of claim 11, wherein scoring the image comprises assigning a score based upon a distance of a set of features of the query image to a set of features representative of a respective one of the image groups.

13. The computing system of claim 11, wherein scoring the image comprises filtering ones of the plurality of image groups that have a score of less than a threshold.

14. The computing system of claim 11, wherein each of the plurality of classifiers is trained using a linear model.

15. The computing system of claim 11, wherein a classifier from the plurality of classifiers is trained for a selected one of the image groups using a positive training sample and a negative training sample, wherein the positive training sample comprises images from the selected group, and wherein the negative training sample comprises images from neighboring groups of the selected group.

16. The computing system of claim 15, wherein the negative training sample further comprises images from at least one of other image groups.

17. The computing system of claim 11, wherein the cluster of the plurality of image groups is further based upon queries associated with the respective images.

18. The computing system of claim 11, wherein the weighted labels are based, at least in part, upon the frequency of occurrence of the label in the image group.

19. The method of claim 1, wherein a classifier from the plurality of classifiers is trained for a selected one of the image groups using a positive training sample and a negative training sample, wherein the positive training sample comprises images from the selected group, and wherein the negative training sample comprises images from neighboring groups of the selected group.

20. The method of claim 19, wherein the negative training sample further comprises images from at least one of other image groups.

* * * * *